March 12, 1963 — M. ZION — 3,080,827
TOY VEHICLE DRIVE
Filed Dec. 17, 1959 — 2 Sheets-Sheet 1
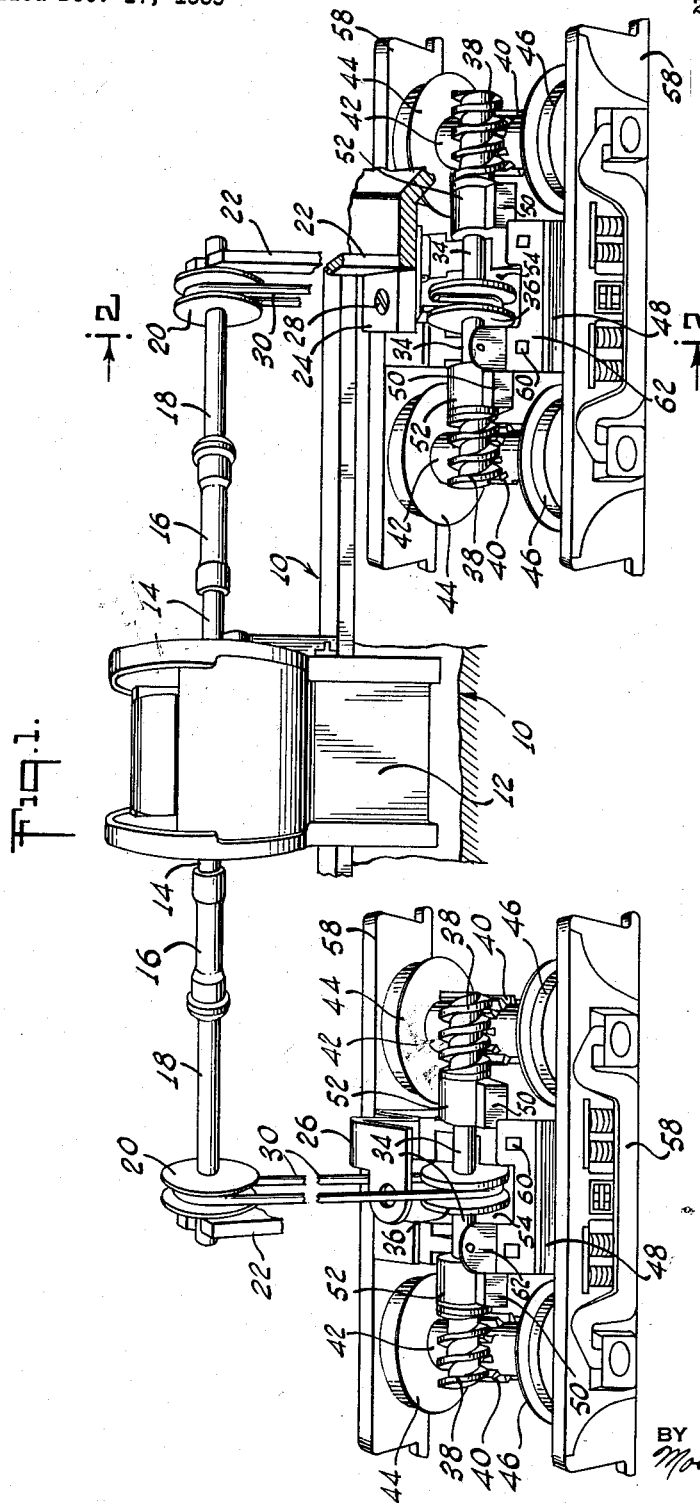
INVENTOR
MOSES ZION
BY
Moses, Nolte, & Nolte
ATTORNEYS March 12, 1963
M. ZION
3,080,827
TOY VEHICLE DRIVE
Filed Dec. 17, 1959
2 Sheets-Sheet 2
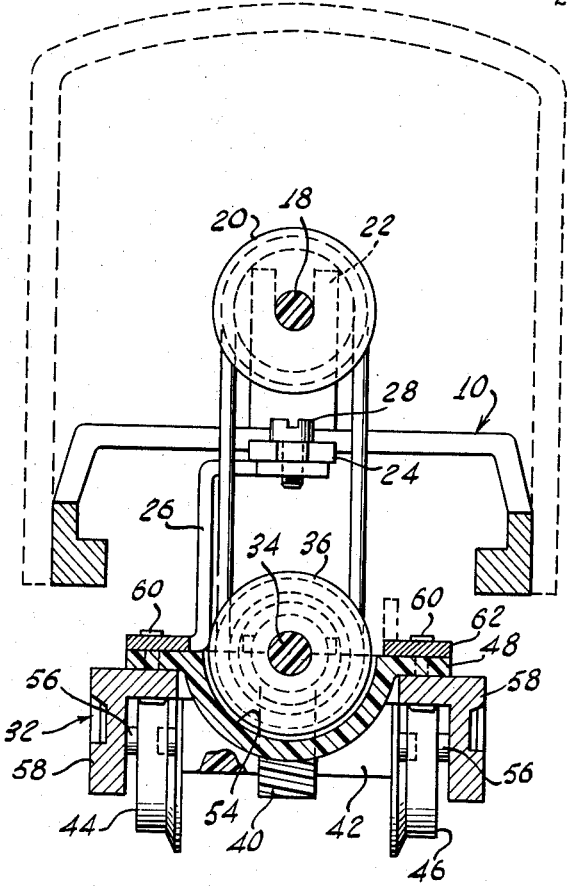
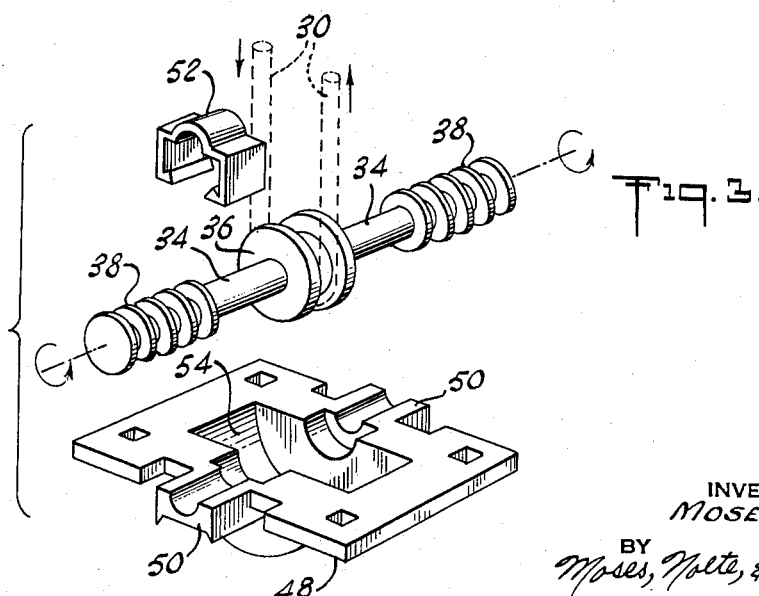
INVENTOR
MOSES ZION
BY
Moses, Nolte, & Nolte
ATTORNEYS

United States Patent Office 3,080,827
Patented Mar. 12, 1963

3,080,827
TOY VEHICLE DRIVE
Moses Zion, Brooklyn, N.Y., assignor to The Lionel Corporation, New York, N.Y., a corporation of New York
Filed Dec. 17, 1959, Ser. No. 860,230
2 Claims. (Cl. 105—101)

This invention relates in general to miniature toy electric trains and in particular to an improved drive mechanism that employs a combination of worm gears and drive pulleys.

The invention is particularly adaptable to model electric trains of the two rail variety, wherein the locomotive drive wheels act as the current pickup means to obtain power from the rails. These system usually employ D.C. current of opposite polarity on each of the running rails. In model railway systems of this type, electrical isolation is of necessity required between drive wheels on opposite sides of the driving truck.

The invention is also particularly adaptable to a low cost design wherein a majority of the parts are molded of nylon or similar plastic to thereby reduce the machining required and also provide good bearing surfaces for the rotating elements. The drive motor of the invention is arranged with a double ended output shaft, flexibly coupled to a frame supported nylon shaft and pulley extension. The location of the pulley is vertically above the pivotal support point of the drive truck and in line with a similar pulley located on a worm drive shaft mounted on the truck. This allows uniform belt drive from the motor shaft extension to the truck even though the latter is pivotally mounted on the locomotive frame.

It is an object of the invention to provide a novel locomotive drive means employing in combination a worm drive and a belt drive.

Another object is to provide a combined belt and gear drive wherein the belt can be easily replaced when worn.

Another object of the invention is the use of both ends of the motor drive shaft for driving power truck assemblies located on opposite ends of a locomotive frame.

Still another object of the invention is the provision of a belt drive between a motor output shaft and the truck worm shaft located in a vertical plane through the truck pivot point.

Still another object of the invention is the provision of a novel truck assembly employing a minimum of parts wherein the truck cross member also provides the bearing journal for the worm shaft and the insulation between the truck sides.

A further object of the invention is to provide a pulley drive mechanism which is extremely simple in design, durable in construction and economical to manufacture.

With these and other objects in view, my invention consists in the construction, arrangement and combination of the various parts of my miniature electric train drive, whereby the objects contemplated are attained, as hereinafter more fully set forth, pointed out in the claims and illustrated in the accompanying drawings, wherein:

FIG. 1 is a diagrammatic perspective view of the drive mechanism of the invention;

FIG. 2 is a cross sectional view taken along the line 2—2 of FIG. 1 showing the cab of the locomotive in dotted portions; and FIG. 3 is an enlarged exploded perspective view of the truck worm drive shaft and journal bearing arrangement.

With reference to the figures, a frame member 10 is shown having mounted thereon a reversible D.C. permanent magnet drive motor 12. At either end of the frame 10, truck assemblies 32 are each pivotally supported by a screw 28 passing through a protruding ear portion 24 of the frame and a truck hanger bracket 26. The truck motor 12 has an output drive shaft 14 extending from opposite ends of the motor and is connected through flexible couplings 16 to molded nylon drive shaft extensions 18. Integral with each drive shaft extension 18 is a pulley 20 and an end projecting portion which is supported by an upstanding frame member 22 to provide a bearing yoke. The location of the pulley 20 on the shaft extension 18 is substantially vertically above the truck pivotal support screw 28 and also above a pulley member 36 located at the midpoint of the truck worm drive shaft 34. Integrally molded on each end of the drive shaft 34 is a worm 38 in engagement with a worm gear 40 located on each drive axle 42. The drive axles are preferably molded from a suitable plastic material such as nylon which provides good wearing qualities for the gear teeth and additionally will electrically insulate the left side drive wheels 44 from the right side drive wheels 46. The truck assemby 32 is composed of side plates 58 secured to one another by a molded nylon cross member 48. This truck cross member provides insulation between the side plates 58 and structural rigidity to the entire truck assembly 32. Each truck side plate is provided with upstanding securing studs 60 which protrude through the cross member 48 and the power contact plate 62 on one side and the truck hanger bracket 26 on the other side. The upper ends of the securing studs 60 are suitably deformed to mechanically secure all three elements. The molded plastic cross member 48 is also provided with extending bearing jourinals 50 which provide the lower half of the bearing support for the truck drive shaft 34. Beneath the centrally located pulley 36 of the truck drive shaft 34 is a depending well portion 54 in the cross member 48. This well adds to the structural strength of the molded cross member and in addition acts as a lower pulley guard.

The truck drive shaft 34 is provided with journals at opposite ends adjacent the worm portion 38. As previously described, the lower half of the journal bearings is provided by the projecting portions 50 of the cross member 48. The upper half of these journal bearings is provided by a molded nylon journal bearing clip 52. This clip is resilient and easily snaps over the lug 50 to positively secure the shaft 34 within the journal bearing, thereby providing a low friction nylon support for the plastic drive shaft. An O-ring type belt 30 is provided to drivably connect the pulley 20 on the motor shaft extension 18 to the pulley 36 on the truck drive shaft 34. The drive belt 30 is in a vertical plane passing substantially through the pivotal support point 24. In this fashion drivable joint connection is obtained between the motor and the truck drive shaft 34 regardless of the angular orientation of the truck relative to the frame member 10.

This arrangement of parts allows fast and simple replacement of worn drive belts. To free the truck from the frame it is only necessary to remove the single support screw 28, raise pulley 20 off the bearing yoke 22, and unhook the upper loop of the belt. The lower portion of the belt may then be released by the mere snap removal of the journal clips 52 to free shaft 38 and allow belt replacement. A similar procedure is followed in reverse in order to reassemble the parts after belt replacement.

Because this particular drive mechanism is adapted to operate on a two rail type model railway system wherein the power is supplied to the locomotive through the car supporting rails, means for conducting the electricity through the wheels to the drive motor is required. The invention accomplishes these purposes by electrically isolating all the wheels on one side of the truck from those wheels on the other side of the truck.

Accordingly, the truck cross member 48 and the axles 42 are of insulating material such as nylon. The wheel pivots 56 on the outside portion of each of the driving wheels is not of an insulating material but, on the contrary, acts to conduct electricity from the wheel member through the pivots to the truck end plates 58. The electrical energy is conducted from the truck plates upwardly through the securing studs 60 to their associated electrical contact plates 26 and 62 to thereby provide a convenient source of power to which electrical connections (not shown) may be made to the motor 12.

From the foregoing description, it can be readily seen how the invention has provided an extremely simple, low cost, locomotive drive which fully utilizes the production advantages of plastic molding. The drive provides positive worm gear connection to all eight driving wheels and in addition provides an O-ring type pulley device which allows pivoting of the truck assembly and permits slippage if a bind occurs. The invention makes the location of the motor 12 on the frame 10 both feasible and practical. Also, the invention uses a minimum of structural parts to both electrically isolate opposite sides of the truck while positively securing the sides to each other. This has been accomplished by the use of plastic axles and truck cross members. Because the motor drive shaft extensions 18 are constructed of nylon material the support 22 need not be of any special bearing material and need only be of an upstanding Y or yoke configuration. The tension of the O-ring belt 30 acts to maintain the shaft extension 18 within the yoke member 22.

While a specific embodiment of the invention has been shown and described in detail to illustrate the application of the invention principles, it will be understood that the invention may be embodied otherwise without departing from such principles.

What is claimed is:

1. A toy train power unit comprising a frame, a motor rigidly mounted on said frame having a drive shaft extending longitudinally of said frame, a pulley mounted on said motor drive shaft, at least two wheeled axles connected to said frame, worm gear means on each of said axles, an axle drive shaft, worm means on said shaft being in driving engagement with said worm gear means, a pulley on said axle drive shaft, journal bearings rotatably mounting said axle drive shaft longitudinally of said frame, said bearings including a semi-cylindrical fixed portion, a removable cap portion of flexible plastic, said cap portion including a substantially semi-cylindrical bearing portion and flexible side portions for snap engagement with the fixed portion of said bearings and belt means connecting said pulleys.

2. A toy train drive truck comprising two truck side members, a cross member of insulating material holding said side members in spaced relation, an upstanding bracket secured to said truck to provide a pivotal support point therefor, at least a pair of axles having wheels journaled between said side members, worm gear means upon a central portion of said axles, said cross member including a pair of longitudinally aligned semi-cylindrical bearing journal halves integrally formed therein, a truck drive shaft rotationally mounted in said journal halves, worm means on said drive shaft in engagement with said axle worm gear means, a pair of resilient plastic bearing journal cap portions, said cap portions being substantially semi-cylindrical and having flexible side portions for snapping engagement with said cross member journal halves, and pulley means upon said shaft substantially vertically below the truck pivotal support point.

References Cited in the file of this patent

UNITED STATES PATENTS

| | | |
|---|---|---|
| 379,786 | Hunt | Mar. 20, 1888 |
| 2,272,280 | Stoltz | Feb. 10, 1942 |
| 2,558,180 | Johnson | June 26, 1951 |
| 2,595,936 | Goode | May 6, 1952 |
| 2,671,415 | Ruth | Mar. 9, 1954 |
| 2,739,541 | Varney | Mar. 27, 1956 |
| 2,774,311 | Berry | Dec. 18, 1956 |
| 2,814,257 | Joyce | Nov. 26, 1957 |
| 2,903,974 | Smith | Sept. 15, 1959 |
| 3,009,425 | Lingard | Nov. 21, 1961 |

FOREIGN PATENTS

| | | |
|---|---|---|
| 804,421 | Germany | Apr. 23, 1951 |